US012474595B2

(12) United States Patent
Bhangale et al.

(10) Patent No.: US 12,474,595 B2
(45) Date of Patent: Nov. 18, 2025

(54) OPHTHALMIC LENS, METHOD OF MANUFACTURING THEREOF, AND EYEWEAR COMPRISING THE OPHTHALMIC LENS

(71) Applicant: ESSILOR INTERNATIONAL, Charenton-le-Pont (FR)

(72) Inventors: Sunil Bhangale, Singapore (SG); Kevin Fitzgerald, Charenton-le-Pont (FR); Ker Chin Ang, Singapore (SG)

(73) Assignee: Essilor International, Charenton-le-Pont (FR)

( * ) Notice: Subject to any disclaimer, the term of this patent is extended or adjusted under 35 U.S.C. 154(b) by 689 days.

(21) Appl. No.: 17/761,875

(22) PCT Filed: Sep. 18, 2020

(86) PCT No.: PCT/EP2020/076184
§ 371 (c)(1),
(2) Date: Mar. 18, 2022

(87) PCT Pub. No.: WO2021/053191
PCT Pub. Date: Mar. 25, 2021

(65) Prior Publication Data
US 2022/0365365 A1 Nov. 17, 2022

(30) Foreign Application Priority Data
Sep. 19, 2019 (EP) .................... 19306140

(51) Int. Cl.
*G02C 7/02* (2006.01)
*B29D 11/00* (2006.01)
(Continued)

(52) U.S. Cl.
CPC .......... *G02C 1/10* (2013.01); *B29D 11/00923* (2013.01); *G02B 1/10* (2013.01);
(Continued)

(58) Field of Classification Search
CPC ........ B29D 11/00432; B29D 11/00923; G02B 1/10; G02B 27/0018; G02C 1/10; G02C 7/00
(Continued)

(56) References Cited

U.S. PATENT DOCUMENTS

| 4,921,341 | A | * | 5/1990 | Ace | ........................ G02C 1/10 351/86 |
| 5,007,977 | A | | 4/1991 | Gottschald | |

(Continued)

FOREIGN PATENT DOCUMENTS

| FR | 2 828 564 | 2/2003 |
| GB | 07033 | 8/1912 |

(Continued)

OTHER PUBLICATIONS

International Search Report for PCT/EP2020/076184, mailed Dec. 14, 2020, 4 pages.
(Continued)

*Primary Examiner* — Mahidere S Sahle
(74) *Attorney, Agent, or Firm* — NIXON & VANDERHYE (57) ABSTRACT

An ophthalmic lens is provided. The ophthalmic lens includes a first optical surface, an opposing second optical surface and an edge surface connecting the first optical surface and the second optical surface, wherein the edge surface is planar. The ophthalmic lens further includes a first layer disposed on the edge surface, wherein the first layer includes a coating material effective to reduce a reflection caused by a profile of the edge surface, and wherein (a) the first layer defines a structural element for fastening the ophthalmic lens to an eyewear frame, or (b) the ophthalmic lens further includes a second layer disposed on the first layer, wherein the second layer defines a structural element (Continued)

for fastening the ophthalmic lens to an eyewear frame. A method of manufacturing the ophthalmic lens and an eyewear including the ophthalmic lens are also provided.

14 Claims, 4 Drawing Sheets

(51) Int. Cl.
  *G02B 1/10* (2015.01)
  *G02B 27/00* (2006.01)
  *G02C 1/00* (2006.01)
  *G02C 7/00* (2006.01)

(52) U.S. Cl.
  CPC ........... *G02B 27/0018* (2013.01); *G02C 7/00* (2013.01); *B29D 11/00432* (2013.01)

(58) Field of Classification Search
  USPC ................................. 351/44–49, 159.01–178
  See application file for complete search history.

(56) References Cited

U.S. PATENT DOCUMENTS

2002/0008847 A1   1/2002  Ayoub
2019/0278109 A1*  9/2019  Ogaya .................. G02B 5/3033

FOREIGN PATENT DOCUMENTS

GB         2 564 656         1/2019
WO    WO-2019016495 A1 *   1/2019   ............. G02C 7/021

OTHER PUBLICATIONS

Written Opinion of the ISA for PCT/EP2020/076184, mailed Dec. 14, 2020, 7 pages.

* cited by examiner

OPHTHALMIC LENS, METHOD OF MANUFACTURING THEREOF, AND EYEWEAR COMPRISING THE OPHTHALMIC LENS

This application is the U.S. national phase of International Application No. PCT/EP2020/076184 filed Sep. 18, 2020, which designated the U.S. and claims priority to EP Patent Application No. 19306140.5 filed Sep. 19, 2019, the entire contents of each of which are hereby incorporated by reference.

TECHNICAL FIELD

This disclosure relates generally to an ophthalmic lens, a method of manufacturing the ophthalmic lens, and an eyewear comprising the ophthalmic lens.

BACKGROUND

Figure 1A:
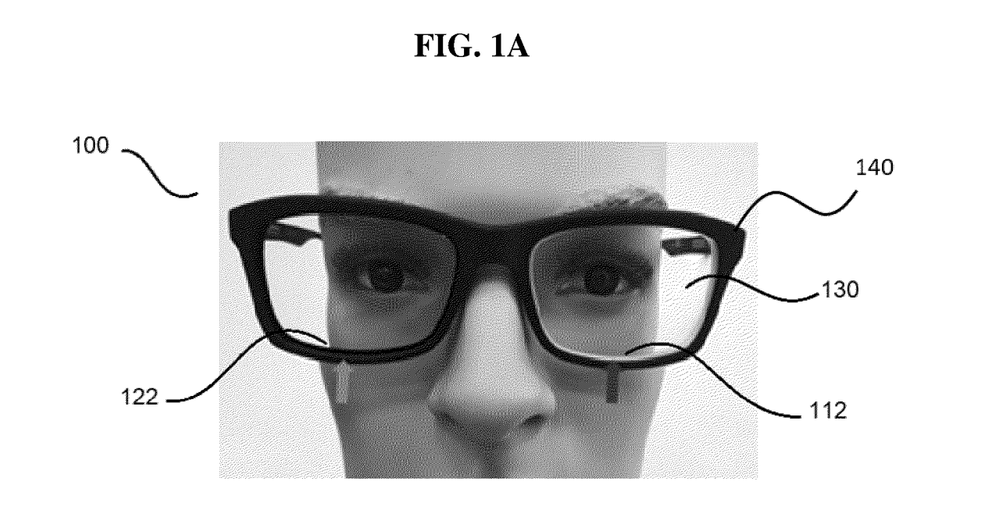
Figure 1B:
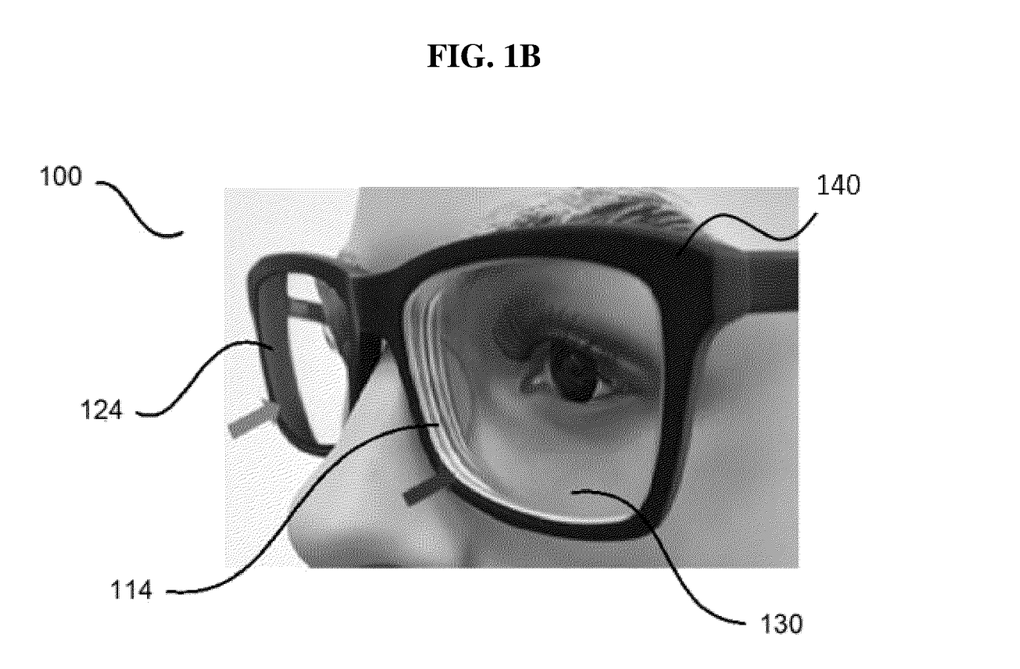

A coating material may be introduced on the edge of an ophthalmic lens as an edge coating for various reasons. For example, an opaque coating may be deposited on the edge of an ophthalmic lens to reduce visibility of myopia rings and white rings for aesthetic purposes. Examples of a white ring and a myopia ring are shown in FIG. 1A and FIG. 1B as 112 and 114, respectively. The myopia rings and white rings may result due to internal reflection of light through the ophthalmic lens. For effective reduction in visibility of the myopia rings and white rings, the edge coating should have good opacity, finishing, mechanical, and adhesion properties to allow masking of the myopia rings and white rings.

To this end, an operator may apply the coating material on the edge of an ophthalmic lens using a marker pen or a brush, or by spray coating. Ideally, the coating material is applied onto the edge surface of the ophthalmic lens only, without any of the coating material being coated on the optical surfaces of the ophthalmic lens. In applying the coating material, the white ring and the myopia ring may be masked so that they are less noticeable than before. Example of an edge surface of the ophthalmic lens having a coating material disposed thereon so as to mask the white ring and the myopia ring are shown in FIG. 1A and FIG. 1B as 122 and 124, respectively.

Figure 2A:
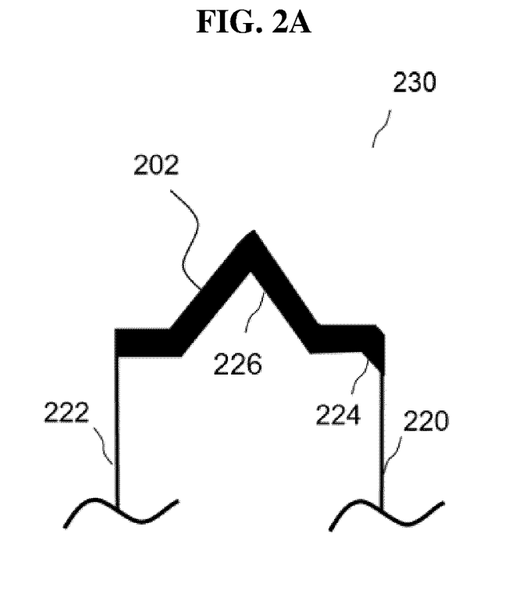
FIG. 2A is a schematic diagram showing an edge coating 202 disposed on an edge surface of an ophthalmic lens 230 and on a safety bevel 224 present between the edge surface and the first optical surface 220. The edge surface of the ophthalmic lens 230 is defined by a surface connecting the first optical surface 220 and the second optical surface 222. The first optical surface 220 and the second optical surface 222 may respectively be a concave (Cc) surface and a convex (Cx) surface of the ophthalmic lens 230. The edge surface of the ophthalmic lens 230 comprises a lens bevel 226. A safety bevel 224 is present between the edge surface and the first optical surface 220, and connecting the edge surface to the first optical surface 220. As depicted in the figure, there is no overflow on the first optical surface 220 and the second optical surface 222 of the ophthalmic lens 230.

For illustration purposes, FIG. 2A is a schematic diagram showing an edge coating 202 disposed on an edge surface and on a safety bevel 224 present between the edge surface and the first optical surface 220 of an ophthalmic lens 230 according to an embodiment. The edge surface of the ophthalmic lens 230 is defined by a surface connecting the first optical surface 220 and the second optical surface 222. The edge surface of the ophthalmic lens 230 comprises a lens bevel 226. As depicted in the figure, there is no overflow on the first optical surface 220 and the second optical surface 222 of the ophthalmic lens 230.

Figure 2B:
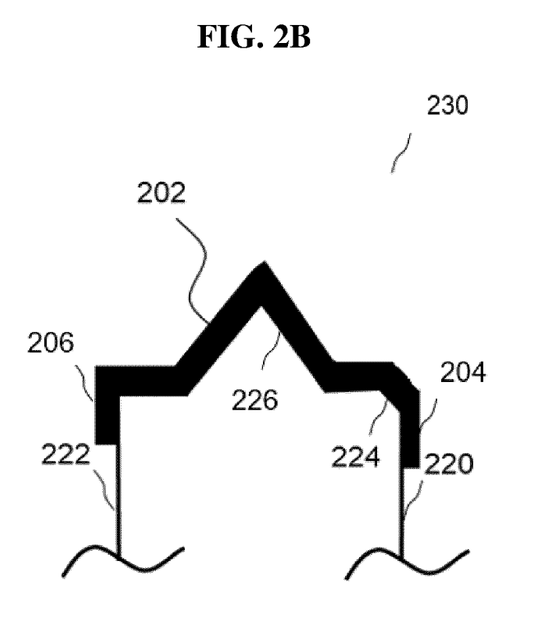
FIG. 2B is a schematic diagram showing an edge coating 202 disposed on an edge surface of an ophthalmic lens 230 and on a safety bevel 224 present between the edge surface and the first optical surface 220. The edge surface of the ophthalmic lens 230 is defined by a surface connecting the first optical surface 220 and the second optical surface 222. The first optical surface 220 and the second optical surface 222 may respectively be a concave (Cc) surface and a convex (Cx) surface of the ophthalmic lens 230. The edge surface of the ophthalmic lens 230 comprises a lens bevel 226. A safety bevel 224 is present between the edge surface and the first optical surface 220, and connecting the edge surface to the first optical surface 220. As depicted in the figure, there is overflow in the form of excess coating material 204, 206 disposed respectively on the first optical surface 220 and the second optical surface 222 of the ophthalmic lens 230.

Notwithstanding the above, the operator often finds himself or herself in a situation whereby he or she accidentally introduces some excess coating, otherwise termed herein as overflow, on the optical surfaces. This is depicted in FIG. 2B, which is a schematic diagram showing an edge coating 202 disposed on an edge surface and on a safety bevel 224 present between the edge surface and the first optical surface 220 of an ophthalmic lens 230. As shown in the figure, there is overflow in the form of excess coating material 204, 206 disposed respectively on the first optical surface 220 and the second optical surface 222 of the ophthalmic lens 230. These overflows are removed completely so as not to compromise aesthetics of the ophthalmic lens. In removing the overflows, however, some of the edge coating 202 may accidentally be removed. Moreover, in embodiments wherein an optical lens edge comprises multiple facets, for example, it is very difficult to ensure complete coating coverage on each and every facet, while not introducing overflows on the optical surfaces.

In light of the above, there remains a need for an improved method of providing a consistent and complete coating coverage on the edge surface of an optical lens, and which addresses or at least alleviates one or more of the above-mentioned problems.

SUMMARY

In a first aspect, there is provided an ophthalmic lens. The ophthalmic lens comprises a first optical surface, an opposing second optical surface and an edge surface connecting the first optical surface and the second optical surface, wherein the edge surface is planar. The ophthalmic lens further comprises a first layer disposed on the edge surface, wherein the first layer comprises a coating material effective to reduce a reflection caused by a profile of the edge surface, and wherein (a) the first layer defines a structural element for fastening the ophthalmic lens to an eyewear frame, or (b) the ophthalmic lens further comprises a second layer disposed on the first layer, wherein the second layer defines a structural element for fastening the ophthalmic lens to an eyewear frame. In some embodiments, the ophthalmic lens is as described in the claims.

In a second aspect, there is provided a method of manufacturing an ophthalmic lens, the method comprising providing an ophthalmic lens comprising a first optical surface, an opposing second optical surface and an edge surface connecting the first optical surface and the second optical surface, wherein the edge surface is planar; forming a first layer comprising a coating material effective to reduce a reflection caused by a profile of the edge surface, on the edge surface of the ophthalmic lens; and (a) wherein the first layer defines a structural element for fastening the ophthalmic lens to an eyewear frame, or (b) forming a second layer on the first layer, wherein the second layer defines a structural element for fastening the ophthalmic lens to an eyewear frame. In some embodiments, the method of manufacturing an ophthalmic lens is as described in the claims.

In a third aspect, there is provided an eyewear comprising an eyewear frame and an ophthalmic lens according to the first aspect. In some embodiments, the eyewear is as described in the claims.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIG. 1A is a photograph showing front view of a user wearing an eyewear 100. A white ring 112 is shown. Also shown is a corresponding edge surface 122 of the ophthalmic lens 130, which was coated with a coating material to reduce visibility of a white ring that would otherwise be present. The color of the coating material was chosen to match the color of the eyewear frame 140.

FIG. 1B is a photograph showing side view of a user wearing an eyewear 100. A myopia ring 114 is shown. Also shown is a corresponding edge surface 124 of the ophthalmic lens 130, which was coated with a coating material to reduce visibility of a myopia ring that would otherwise be present. The color of the coating material was chosen to match the color of the eyewear frame 140.

DESCRIPTION

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts.

Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

As disclosed herein, an ophthalmic lens is provided in which the edge surface connecting the first optical surface and the second optical surface is planar. Advantageously, the planar edge surface helps to reduce or prevent myopia rings, which may be caused by total internal reflection when light travels from the lens edge to the air gap between the lens and the frame, and may be generated due to reflection of light from one or both of the optical surfaces and/or the edge surface. This is particularly true at the lens edges, which, oftentimes, have been shaped in order to be fitted into the frame. In cases whereby the edge surface of a lens comprises a lens bevel structure and/or other possible geometries, they introduce various surfaces onto the edge surface, all of which constitute a profile of the edge surface. Areas of light reflections at various angles and directions are introduced, which further contribute to appearance of myopia rings.

By disposing a coating material effective to reduce a reflection on the planar edge surface of an ophthalmic lens disclosed herein, this allows formation of a coating layer comprising the material with improved uniformity in terms of thickness and/or surface coverage, thereby reducing or eliminating defects. Moreover, since the edge surface is planar, it is at least substantially free or free from reflections from angular edges of a lens bevel otherwise present in state of the art ophthalmic lenses, thereby effectively reducing multiplied reflection from the first optical surface and the second optical surface of the ophthalmic lenses. In so doing, visibility of the myopia rings otherwise appearing along the perimeter of the ophthalmic lens face may be reduced or eliminated more effectively. Furthermore, since the coating material effective to reduce a reflection caused by a profile of the edge surface is disposed on a planar surface, this provides ease in coating of the material to suppress myopia rings efficiently.

With the above in mind, various embodiments refer in a first aspect to an ophthalmic lens. The term "ophthalmic lens" refers to any type of lens intended to be supported by a wearer's face in the form of an eyewear, whereby the term "eyewear" refers generally to items and accessories worn on or over the eyes, which may be for purposes of improving or enhancing visual acuity, for protecting against the environment, for fashion, or for adornment. Examples of eyewear may include eyeglasses, goggles, or other objects on or worn over the eyes, or head-mounted devices. Eyeglasses, also termed herein as glasses or spectacles, may include sunglasses, prescription glasses, prescription sunglasses, transitional glasses, reading glasses, safety glasses, novelty glasses, costume glasses, 3D glasses, fashion glasses, and the like.

Examples of ophthalmic lens include non-corrective lenses, semi-finished lens blanks, and corrective lenses, such as progressive addition lenses, unifocal or multifocal lenses. The term may also include one or more of prescription, non-prescription, reflective, anti-reflective, magnifying, polarizing, filtering, anti-scratch, colored, tinted, clear, anti-fogging, ultraviolet (UV) light protected, or other lenses. Further examples of ophthalmic lens include active lens such as photochromic lens, electrochromic lens, fluidic lens, or liquid crystal lens; electronic lens, virtual reality (VR) lens, augmented reality (AR) lens, and the like.

An ophthalmic lens is generally manufactured in accordance with wearer specifications from an ophthalmic lens blank such as a semi-finished lens blank. A semi-finished lens blank generally has two opposite surfaces at least one of which is unfinished. The unfinished surface of the lens blank may be machined according to the wearer's prescription to provide the required surface of the ophthalmic lens. An ophthalmic lens having finished back and front surfaces may be referred to as an uncut ophthalmic lens. In the case of an ophthalmic lens for the correction or improvement of eyesight, for example, the ophthalmic lens may be manufactured according to a wearer prescription corresponding to the visual requirements of that wearer. At least one of the surfaces of the ophthalmic lens may be processed to provide an ophthalmic lens according to the wearer prescription.

In embodiments in which the ophthalmic lens is supported by an eyewear frame, the shape and size of the eyewear frame supporting the ophthalmic lens may also be taken into account. For example, the contour of the uncut ophthalmic lens may be edged according to a shape of a spectacle frame on which the ophthalmic lens is to be mounted in order to obtain an edged or cut ophthalmic lens.

As mentioned above, an ophthalmic lens may be manufactured in accordance with wearer specifications and which may be processed to provide the ophthalmic lens with various functions. Accordingly, ophthalmic lens may have a complex structure resulting from interlayering of materials and/or a series of treatments to tailor the ophthalmic lens to specific user requirements. For example, the treatments may be carried out to reduce thickness and to render the ophthalmic lens lightweight, to improve on transparency, for durability, strength and protection, aesthetics etc. It follows that an ophthalmic lens may comprise one or more coatings disposed on a surface of a substrate functioning as an optical surface, such as an anti-breakage coating, an anti-scratch coating, an anti-reflection coating, a tint coating, a color coating, an anti-static coating, or an anti-smudge coating.

Accordingly, the term "optical surface" as used herein refers to surface of a substrate in the form of a bare ophthalmic lens without any coating disposed on the optical surface(s), such as an unfinished or untreated ophthalmic lens, as well as surface of a coating which may be designed to be temporarily or permanently disposed on the optical surface(s) of a bare ophthalmic lens. Examples of a coating that may be disposed on an ophthalmic lens have already been mentioned above, and may further include, but are not limited to, (1) topcoat, (2) anti-reflective (AR) coatings and asymmetrical mirrors, and/or (3) hardcoat (HC).

The ophthalmic lens disclosed herein comprises a first optical surface, an opposing second optical surface, and an edge surface connecting the first optical surface and the second optical surface.

In various embodiments, the first optical surface and the second optical surface may independently be a substrate, a substrate having a hard coat, or a substrate having a hard multi-coat (HMC) coating, i.e. an antireflective (AR) coating, a hardcoat (HC), and a topcoat disposed thereon. In various embodiments, the first optical surface and the second optical surface may respectively be a concave (Cc) surface and a convex (Cx) surface of the ophthalmic lens.

The first optical surface and the second optical surface are connected by an edge surface. As used herein, the term "edge surface" refers to a lateral flank and/or external contour of an ophthalmic lens, or a peripheral shape connecting the first optical surface and second optical surface of an ophthalmic lens. For example, the edge surface may define a surface on the lateral flank and/or external contour of an ophthalmic lens upon which a coating material is to be disposed.

In embodiments disclosed herein, the edge surface is planar. By the term "planar", this means that the edge surface is a generally flat surface, and can include weakly bent or slightly curved surfaces. It follows that the edge surface disclosed herein does not have significant projections or depressions. In various embodiments, the edge surface is flat. The term "flat" is used herein to describe a surface that does not have a substantially varying surface normal angle across it. By this, it means that the surface normal angle at a specific location of the edge surface is kept within 10%, such as within 8%, within 5%, or within 3%, of the average surface normal angle across the edge surface.

Since the edge surface is planar, it follows that a lens bevel is not integrally formed with the ophthalmic lens. As used herein, the term "lens bevel" refers generally to a structural element shaped like a "V", or in the form of a polyhedron such as a pyramid or a tetrahedron, which is present or disposed on the edge surface of a lens, and may help to secure the lens after it has been inserted in an eyewear frame. Given that the lens bevel is not integrally formed with the ophthalmic lens as disclosed herein, this distinguishes from state of the art ophthalmic lenses, whereby a lens bevel is integrally formed with the ophthalmic lens, and/or whereby the lens bevel is formed of the same material as that of the ophthalmic lens.

In various embodiments, the edge surface, which is planar, is directly connected to the first optical surface and the opposing second optical surface. In some embodiments, the planar edge surface is not directly connected to the first optical surface and the opposing second optical surface. Instead, a safety bevel is present between the edge surface and the first optical surface, and/or between the edge surface and the second optical surface. In this configuration, the edge surface is connected to the first and second optical surface via a respective safety bevel. As used herein, the term "safety bevel" refers to a flattening bevel ground on the external contour of the ophthalmic lens, which may be formed at an interface between the external contour and the optical faces of the ophthalmic lens, whereby the sharp edges have been removed for a safer lens. Example of a safety bevel is shown in FIG. 2A and FIG. 2B.

As mentioned above, myopia rings may be caused by total internal reflection when light travels from the lens edge to the air gap between the lens and the frame, and may be generated due to reflection of light from one or both of the optical surfaces and/or the edge surface. Particularly, due to the angular edges of a lens bevel, reflection of light from one or more of the angular edges may take place to result in multiplied reflection from the first optical surface and the second optical surface of the ophthalmic lenses. These result in appearance of myopia rings along the perimeter of the ophthalmic lens face.

Advantageously, the planar edge surface disclosed herein helps to reduce or prevent myopia rings. As disclosed herein, a coating material effective to reduce a reflection on the planar edge surface of an ophthalmic lens is disposed on the planar edge surface, to form a first layer comprising the material. This allows formation of a coating layer comprising the material with improved uniformity in terms of thickness and/or surface coverage, thereby reducing or eliminating defects, which in turn reduces or prevents myopia rings. Furthermore, since the edge surface is planar, reflections from angular edges of a lens bevel that are present in state of the art ophthalmic lenses, are not present in an ophthalmic lens disclosed herein, thereby effectively reducing multiplied reflection from the first optical surface and the second optical surface of the ophthalmic lenses. In so doing, visibility of the myopia rings otherwise appearing along the perimeter of the ophthalmic lens face may be reduced or eliminated more effectively. Furthermore, since the coating material effective to reduce a reflection caused by a profile of the edge surface is disposed on a planar surface, this provides ease in coating of the material to suppress myopia rings efficiently.

In various embodiments, the coating material effective to reduce a reflection caused by a profile of the edge surface is also effective to reduce a transmission of light through the edge surface. In other words, the coating material may have sufficient opacity so that transmission of light through the edge surface from both outside and within the lens is reduced. Coating materials according to embodiments disclosed herein are able to fulfil one or more of objectives of fast drying (at least within 2 to 3 hours), almost 100% opacity, good mechanical performance, solvent resistance, and adhesion properties, and with matching refractive index of lens with majority of substrates.

The opacity of the material that is being used to form the first layer may be imparted from an opacity agent contained in the material. As used herein, the term "opacity agent" refers to a substance or an additive added to a material so as to reduce transparency or light transmittance through the material. In this regard, the material may function as a matrix for holding the opacity agent, and the opacity agent may be dispersed in the matrix.

In various embodiments, the opacity agent comprises a material selected from the group consisting of carbon black, an organic pigment, an inorganic pigment, titanium dioxide, calcium oxide, beryllium oxide, cerium oxide, barium sulphate, carbon nanotube, and a combination thereof.

The opacity agent may be dispersed in a matrix material. The term "matrix material" as used herein refers to any support, which may be liquid, semi-solid, or solid, for carrying the opacity agent and/or other components of the coating material. In various embodiments, the opacity agent is dispersed at least substantially homogeneously in the matrix material.

Examples of the matrix material may include, but is not limited to, a UV-curable composition such as acrylate, epoxy, unsaturated polymer, silane, styrene, vinyl chloride, vinyl acetate, a thermal-curable composition such as polyurethane (of which nitrocellulose modified polyurethane is one example), polyurea, epoxy, polyester, polyamide, polyimide, polyether, alkyd, polycarbonate, or a combination thereof. In various embodiments, the matrix material comprises a material selected from the group consisting of a polyurethane, an epoxy, an acrylate, cellulose acetate butyrate, silicone, a polyester, a copolymer thereof, and a combination thereof. In specific embodiments, the matrix material is a cross-linked polyurethane.

Weight ratio of the matrix material to the opacity agent may be in the range of about 1:0.05 to about 1:3, such as about 1:0.1 to about 1:3, about 1:0.5 to about 1:3, about 1:1 to about 1:3, about 1:1.5 to about 1:3, about 1:2 to about 1:3, about 1:2.5 to about 1:3, about 1:0.05 to about 1:2.5, about 1:0.05 to about 1:2, about 1:0.05 to about 1:1.5, about 1:0.05 to about 1:1, about 1:0.05 to about 1:0.5, about 1:0.05 to about 1:0.1, about 0.5 to about 1:2.5, or about 1:1 to about 1:2.

The various combinations of matrix material and opacity agent disclosed herein are examples of materials effective to reduce a reflection caused by a profile of the edge surface, and may also be effective to reduce a transmission of light through the edge surface.

As mentioned above, due to the edge surface being planar, a lens bevel is not integrally formed with the ophthalmic lens. Even though the lens bevel is not integrally formed with the ophthalmic lens according to embodiments disclosed herein, it may nevertheless be present in the ophthalmic lens, for purpose of securing the ophthalmic lens after it has been inserted in an eyewear frame.

For example, the first layer comprising the coating material and which is disposed on the edge surface may define a structural element, such as a lens bevel, for fastening the ophthalmic lens to an eyewear frame. As used herein, the term "structural element" refers to a component, a part, an arrangement, or a configuration, of or defined by, the first layer and/or second layer, which provides for fastening of the ophthalmic lens to an eyewear frame. Accordingly, the structural element may have any suitable shape, such as a regular shape of a cube, a sphere, a hemisphere, or a polyhedron such as a pyramid or a tetrahedron, or an irregular shape such as a free-form shape, so long as it provides for or allows fastening of the ophthalmic lens to an eyewear frame.

In embodiments wherein the first layer further comprises an adhesive, such as epoxy, polyurethane, silicone, and acrylate-based adhesive, for example, the adhesive comprised in the first layer allows fastening of the ophthalmic lens to an eyewear frame. Accordingly, the structural element in such an adhesive-containing first layer may have a relatively flat structure and/or a free-flow structure, so as to maximise contact, or contact area, between the first layer and the eyewear frame to allow fastening of the ophthalmic lens to the eyewear frame.

In some embodiments, the first layer does not comprise an adhesive.

Accordingly, the structural element may have a suitable shape, for example a regular shape such as a cube, a sphere, a hemisphere, or a polyhedron such as a pyramid or a tetrahedron, to allow coupling with a complementary shape on an eyewear frame so as to allow fastening of the ophthalmic lens to an eyewear frame.

The structural element may constitute a profile on the edge surface. In other words, the first layer may serve to prevent internal reflections that cause myopia rings, as well as to provide a structural element for fastening the ophthalmic lens to an eyewear frame. As mentioned above, this distinguishes from state of the art ophthalmic lenses, whereby a lens bevel is integrally formed with the ophthalmic lens, and/or whereby the lens bevel is formed of the same material as that of the ophthalmic lens.

Accordingly, the first layer comprising the coating material may be a continuous layer, and have any thickness which is sufficient to cover the edge surface of the ophthalmic lens as well as to define the structural element. In this sense, thickness of the first layer includes that conferred by the structural element as well. By the term "continuous", this means that the first layer covers at least 90% of the edge surface, such as at least about 95%, at least about 96%, at least about 97%, at least about 98%, at least about 99%, or 100% of the edge surface.

In various embodiments, the first layer including the structural element has a thickness in the range of about 1.24 mm to about 2.18 mm, of which the structural element may have a height of about 1.22 mm to about 2.1 mm. In other words, thickness of the first layer in regions whereby the structural element is not present may be in the range of about 20 µm to about 80 µm.

As another example, the ophthalmic lens may further comprise a second layer disposed on the first layer, wherein the second layer defines a structural element for fastening the ophthalmic lens to an eyewear frame. Accordingly in such embodiments, the first layer comprising the coating material effective to reduce a reflection caused by a profile of the edge surface may or may not define a structural element such as a lens bevel for fastening the ophthalmic lens to an eyewear frame, since the second layer defines such a structural element. As mentioned above, the structural element may have any suitable shape, such as a regular shape of a cube, a sphere, a hemisphere, or a polyhedron such as a pyramid or a tetrahedron, or an irregular shape such as a free-form shape, so long as it provides for or allows fastening of the ophthalmic lens to an eyewear frame. In other words, in embodiments wherein the second layer is present, the first layer may be in the form of a planar layer having a substantially uniform thickness throughout the layer. Thickness of the first layer may be in the range of about 20 µm to about 80 µm.

The second layer may or may not be a continuous layer disposed on the first layer. In some embodiments, the second layer is a continuous layer disposed on the first layer. Thickness of the second layer as defined herein includes that conferred by the structural element as well, and may be in the range of about 1.24 mm to about 2.18 mm, of which the structural element may have a height of about 20 µm to about 80 µm.

In specific embodiments, the second layer is present and the first layer is planar.

The second layer, if present, may be formed from a material selected from the group consisting of an epoxy, a polyester, a polyurethane, acrylonitrile butadiene styrene, an acrylate, cellulose acetate butyrate, a copolymer thereof, and a combination thereof. In some embodiments, the second layer comprises or consists of an adhesive. Examples of suitable adhesive may include, but are not limited to, epoxy, polyurethane, silicone, and acrylate-based adhesive. In such embodiments, the structural element defined by the second layer may assume a free-form structure, so as to maximise contact or contact area between the second layer and the eyewear frame, for fastening the ophthalmic lens to the eyewear frame.

In some embodiments, the second layer does not comprise an adhesive. Accordingly, the structural element defined by the second layer may have a suitable shape, for example a regular shape such as a cube, a sphere, a hemisphere, or a polyhedron such as a pyramid or a tetrahedron, to allow coupling with a complementary shape on an eyewear frame so as to allow fastening of the ophthalmic lens to an eyewear frame.

The second layer, if present, may be formed from a material which is the same as or different from the first layer. In some embodiments, the second layer is disposed directly on the first layer. In various embodiments, the second layer, if present, is formed from a material different from the first layer. For example, the first layer may comprise or consist of carbon black as an opacity agent dispersed in polyurethane as a matrix material, whereas the second layer may comprise or consist of an epoxy.

Various embodiments refer in a second aspect to a method of manufacturing an ophthalmic lens.

The method comprises providing an ophthalmic lens comprising a first optical surface, an opposing second optical surface, and an edge surface connecting the first optical surface and the second optical surface, wherein the edge surface is planar. Examples of ophthalmic lens have already been described above.

The method disclosed herein comprises forming a first layer comprising a coating material effective to reduce a reflection caused by a profile of the edge surface, on the edge surface of the ophthalmic lens. In various embodiments, the coating material effective to reduce a reflection caused by a profile of the edge surface is also effective to reduce a transmission of light through the edge surface. In other words, the coating material may have sufficient opacity so that transmission of light through the edge surface from both outside and within the lens is reduced.

In various embodiments, forming the first layer comprises disposing the coating material effective to reduce a reflection caused by a profile of the edge surface, on the edge surface of the ophthalmic lens, and shaping the disposed coating material to define the structural element for fastening the ophthalmic lens to an eyewear frame.

Disposing the first layer may generally be carried out using any suitable deposition or coating method, such as a conformal deposition method. For example, disposing the first layer may be carried out by a method selected from the group consisting of vacuum deposition, vapor deposition, sol-gel deposition, spin coating, dip coating, spray coating, flow coating, film laminating, sticker coating, roller coating, brush coating, painting, sputtering, casting, Langmuir-Blodgett deposition, laser printing, inkjet printing, screen printing, pad printing, and a combination thereof.

Shaping the disposed coating material to define the structural element for fastening the ophthalmic lens to an eyewear frame may be carried out using any suitable method, such as using a shaping tool, and/or be carried out by mold casting or physically working the disposed coating material to form the structural element.

For example, a shaping tool may be in the form of a mold, and the shaping may be carried out by mold casting. Mold casting the disposed coating material may include shaping the disposed coating material using a mold having a geometry complementary to the shape of the structural element, and curing the resultant shaped coated material using heat and/or electromagnetic radiation such as ultraviolet radiation or infrared radiation, to form the structural element. In such embodiments, the disposed coating material may be in a partially cured state, in order that the material may move and adapt to the shape of the mold, and subsequently be fixed in its final form by curing. Physically working the disposed coating material may involve shaping the disposed coating material using a shaping tool, such as a cutter, to form the structural element, whereby the structural element may have any suitable shape as mentioned above. In embodiments wherein the first layer further comprises an adhesive, for example, physically working the disposed coating material may involve shaping the disposed coating material such that the structural element is at least substantially flat to provide for maximal contact with an eyewear frame, so as to fasten the ophthalmic lens to the eyewear frame.

In some embodiments, forming the first layer comprises disposing the coating material effective to reduce a reflection caused by a profile of the edge surface, on the edge surface of the ophthalmic lens, wherein the disposing is carried out in such manner as to shape the material disposed to define the structural element for fastening the ophthalmic lens to an eyewear frame.

For example, disposing the coating material may be carried out using methods such as extrusion or an additive manufacturing process such as 3D printing and Fused Deposition Modeling (FDM), so that shaping of the coating material may be carried out at the same time at which the disposing is carried out.

In various embodiments, forming the first layer comprises providing a preshaped structural element for fastening the ophthalmic lens to an eyewear frame, wherein the preshaped structural element comprises the coating material effective to reduce a reflection caused by a profile of the edge surface, and disposing the preshaped structural element on the edge surface of the ophthalmic lens.

For example, instead of forming the structural element during or after disposing the coating material on the edge surface of the ophthalmic lens, the structural element may be formed prior to the disposing. In other words, the structural element may be shaped prior to the disposing, otherwise termed herein as "preshaping" or "preshaped". To attach or secure the preshaped structural element to the underlying edge surface, disposing the preshaped structural element may further comprise applying an adhesive to one or both the preshaped structural element and the edge surface of the ophthalmic lens to attach the preshaped structural element to the edge surface of the ophthalmic lens. Examples of suitable adhesive may include, but are not limited to, an epoxy, polyurethane, silicone, and acrylate-based adhesive. Colorants may be incorporated into the adhesive for cosmetic purposes, and/or to further reduce reflection caused by a profile of the edge surface.

In embodiments whereby the first layer further comprises an adhesive, such as that described above, disposing the preshaped structural element may be carried out directly without applying an adhesive to one or both the preshaped structural element and the edge surface of the ophthalmic lens to attach the preshaped structural element to the edge surface of the ophthalmic lens, since the first layer already provides an adhesive function.

The method disclosed herein may further comprise forming a second layer on the first layer, wherein the second layer defines a structural element for fastening the ophthalmic lens to an eyewear frame. As mentioned above, in such embodiments, the first layer comprising the coating material effective to reduce a reflection caused by a profile of the edge surface may or may not define a structural element such as a lens bevel for fastening the ophthalmic lens to an eyewear frame, since the second layer defines such a structural element. In other words, in embodiments wherein the second layer is present, the first layer may be in the form of a planar layer having a substantially uniform thickness throughout the layer.

In various embodiments, forming the second layer comprises disposing a substance for forming the second layer on the first layer, and shaping the disposed substance to define the structural element for fastening the ophthalmic lens to an eyewear frame. Methods described above for disposing the first layer and shaping the disposed substance may similarly be used for disposing the second layer.

In some embodiments, forming the second layer comprises disposing a substance for forming the second layer on the first layer, wherein the disposing is carried out in such manner as to shape the disposed substance to define the structural element for fastening the ophthalmic lens to an eyewear frame. Methods described above for disposing the first layer in such manner as to shape the material disposed to define the structural element for fastening the ophthalmic lens to an eyewear frame, such as extrusion and an additive manufacturing process such as 3D printing and FDM, may similarly be used for disposing the second layer.

In various embodiments, forming the second layer comprises providing a preshaped structural element for fastening the ophthalmic lens to an eyewear frame, wherein the preshaped structural element comprises a substance for forming the second layer, and disposing the preshaped structural element on the first layer. Examples of suitable structural element have already been mentioned above. Disposing the preshaped structural element may further comprise applying an adhesive to one or both the preshaped structural element and the first layer to attach the preshaped structural element to the first layer. Methods described above for disposing the preshaped structural element as the first layer and for attaching the preshaped structural element to the underlying surface may similarly be used for disposing the second layer.

The second layer, if present, may be formed from a material selected from the group consisting of an epoxy, a polyester, a polyurethane, acrylonitrile butadiene styrene, an acrylate, cellulose acetate butyrate, a copolymer thereof, and a combination thereof.

As mentioned above, the second layer may in some embodiments comprise or consist of an adhesive. Examples of suitable adhesive may include, but are not limited to, epoxy, polyurethane, silicone, and acrylate-based adhesive. In such embodiments, the structural element defined by the second layer may assume a free-form structure or a shape that is at least substantially flat, so as to maximise contact or contact area between the second layer and the eyewear frame, for fastening the ophthalmic lens to the eyewear frame.

In some embodiments, the second layer does not comprise an adhesive. Accordingly, the structural element defined by the second layer may have a suitable shape, for example a regular shape such as a cube, a sphere, a hemisphere, or a polyhedron such as a pyramid or a tetrahedron, to allow coupling with a complementary shape on an eyewear frame so as to allow fastening of the ophthalmic lens to an eyewear frame.

The second layer, if present, may be formed from a material which is the same as or different from the first layer. In some embodiments, the second layer is disposed directly on the first layer. In various embodiments, the second layer, if present, is formed from a material different from the first layer. For example, the first layer may comprise or consist of carbon black as an opacity agent dispersed in polyurethane as a matrix material, whereas the second layer may comprise or consist of an epoxy.

In specific embodiments, the second layer is present and the first layer is planar.

Various embodiments refer in a third aspect to an eyewear comprising an eyewear frame and an ophthalmic lens according to the first aspect.

As mentioned above, the ophthalmic lens disclosed herein may be an augmented reality (AR) lens or a virtual reality (VR) lens. Accordingly, the eyewear may be in the form of an AR or VR device comprising an ophthalmic lens disclosed herein, whereby the ophthalmic lens may be configured with or without power correction. Due to presence of artificial light sources which are used to generate imaginary images in the AR/VR devices, reflections are accentuated in these devices. Advantageously, an ophthalmic lens disclosed herein allows further reduction of reflections off the edge surface of the lens as compared to conventional lenses.

Furthermore, methods disclosed herein are able to provide flexibility with respect to the type of ophthalmic lens manufactured, since ophthalmic lens with planar edge surfaces meant for use in frameless eyewear may be converted using a method disclosed herein into an ophthalmic lens comprising a structural element for fastening into an eyewear frame, and which may accordingly be used in an eyewear comprising an eyewear frame.

In order that the invention may be readily understood and put into practical effect, particular embodiments will now be described by way of the following non-limiting examples.

EXAMPLES

Various embodiments of the present disclosure describe an enhanced configuration of lens with efficient suppression of myopia rings. The innovation outlined herein according to embodiments provides a lens configuration that allows ease in providing color edge coating to suppress myopia rings efficiently. It also helps to minimize myopia ring appearance due to flat edge surface.

Various embodiments described herein may be used for any lens material and any frame shape and size. It may be used for prescription lenses as well as sunwear. It may be implemented at manufacturing plants, as well as prescription labs whereby customized production according to prescription order from the wearer may be carried out. For example, when making progressive lens, the manufacturing plant may provide semi-finished lens as a blank to the prescription lab, which may then carry out machining on the specific power distribution of the lens according to a prescription order from the wearer.

Suppression of myopia rings in colored-edge-lenses may be effected by providing a colored coating on edged surface of the lenses. In cases whereby the edged surface of a lens comprises a lens bevel structure and/or other possible geometries, they introduce various surfaces onto the edged surface and thus provide areas of light reflections at various angles and directions. Irrespective of the optical powers of the lenses, these additional reflections from the bevel surfaces add up the appearance of the myopia rings.

Although appearance of myopia rings may be suppressed by providing a light absorbing colored coating on the lens edge which covers all the reflecting surfaces making them non-reflective, the bevel geometries may render the coating application complex and often lead to non-uniform thickness of coating. This may in turn lead to irregular suppression of myopia rings across the edge surface of a lens.

The subject matter disclosed herein proposes solutions to the two key problems described above.

The present innovation proposes to edge the lens without bevel, keeping the edged surface flat.

Figure 3A:
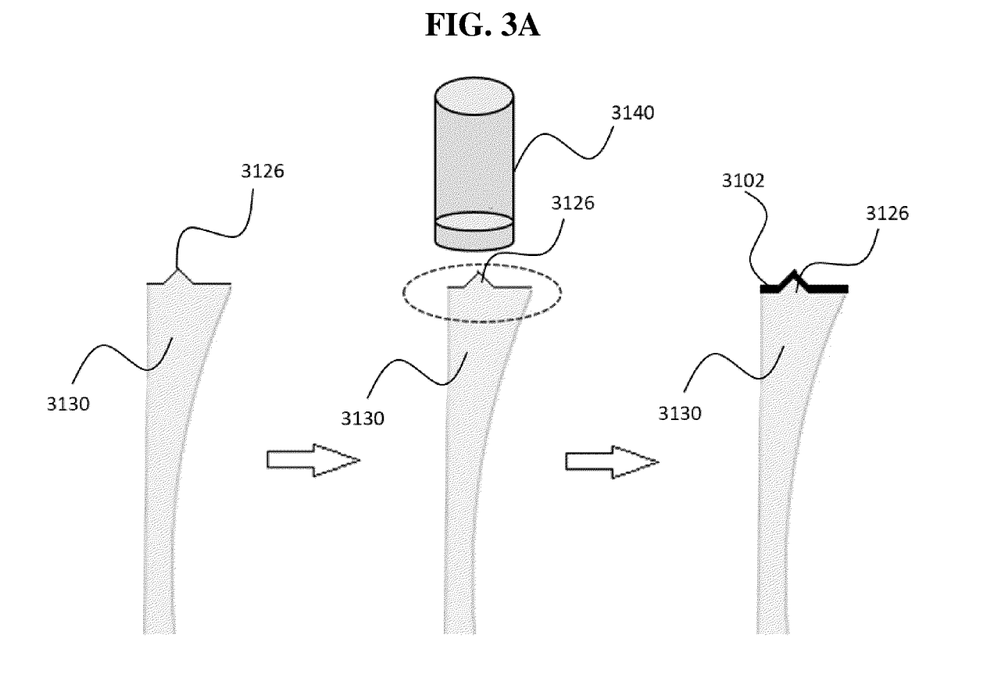
FIG. 3A is a schematic diagram of a process that is being used to coat a layer 3102 comprising a coating material on an edge surface of an ophthalmic lens 3130, whereby the edge surface contains a lens bevel 3126. A coating applicator 3140 applies a coating material on the edge surface including the lens bevel 3126.
Figure 3B:
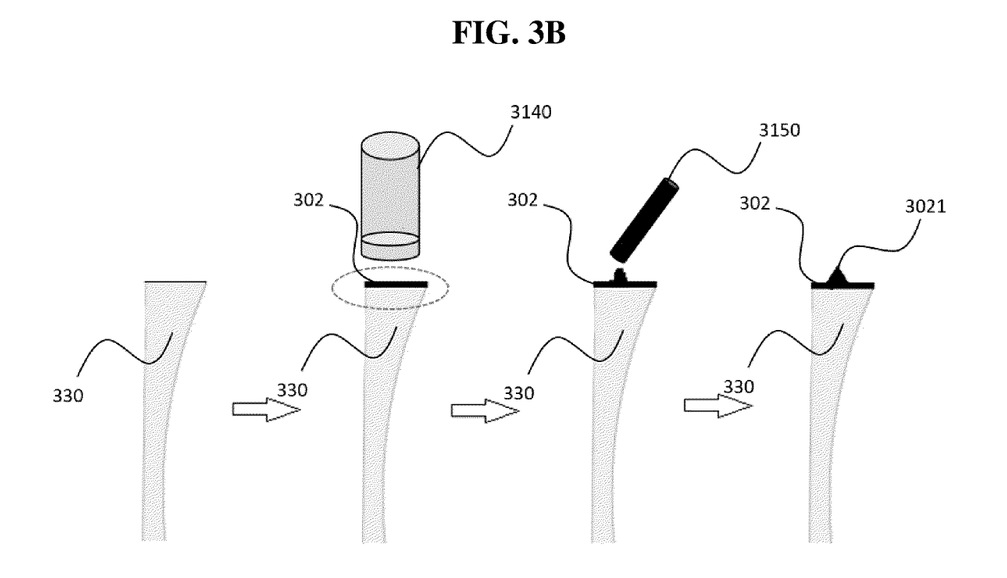
FIG. 3B is a schematic diagram of a process that is being used to coat a first layer 302 comprising a coating material on an edge surface of an ophthalmic lens 330 according to an embodiment disclosed herein. As shown, the edge surface of the ophthalmic lens 330 is planar, and does not contain a lens bevel. A coating applicator 3140 applies a coating material on the planar edge surface to form a first layer 302. A shaping tool 3150 forms a lens bevel 3021 from the coating material.

In the first embodiment (A) as shown in FIG. 3B, a coating material may be applied onto a flat edged surface with greater ease (compared to lens edge with bevel), leading to highly uniform coating layer without or with a lower incidence of defects. The use of a flat edge surface may enhance myopia rings suppression in 2 ways:

Firstly, as it is flat, it is free from the reflections from angular edges of the bevel, thereby effectively reducing multiplied reflection from concave/convex (CC/CX) surfaces of lens, and thus reduce appearance of myopia rings.

Secondly, the flat surface may allow highly uniform layer of coating material with uniform thickness, reducing the defects and thus enhancing myopia ring suppression.

Upon drying of coating material, the bevel geometry may be formed onto the colored edged surface of lens using either color or transparent polymeric material along the rim with predefined shape and size. The bevel structure may be formed by polymers, elastomers, UV curing and/or thermal curing polymeric systems. Some examples of such materials are epoxy, polyurethane, silicones, acrylates, etc.

The bevel structure may be formed by 'forming material', which may be colored or colorless, made of similar chemistry as the coating material (such as polyurethane), or it may be of any other chemistry such as epoxy, silicone, and acrylates. The bevel structure may be formed by depositing the 'forming material' onto the coated edge in the form of highly viscous/semi-solid strips in shape of a bevel. The strips may be 'shaped-up' in bevel by using a finishing tool with a geometry complementary to the bevel shape. The forming material may be solidified by curing, either with UV, IR or heat energy.

Figure 3C:
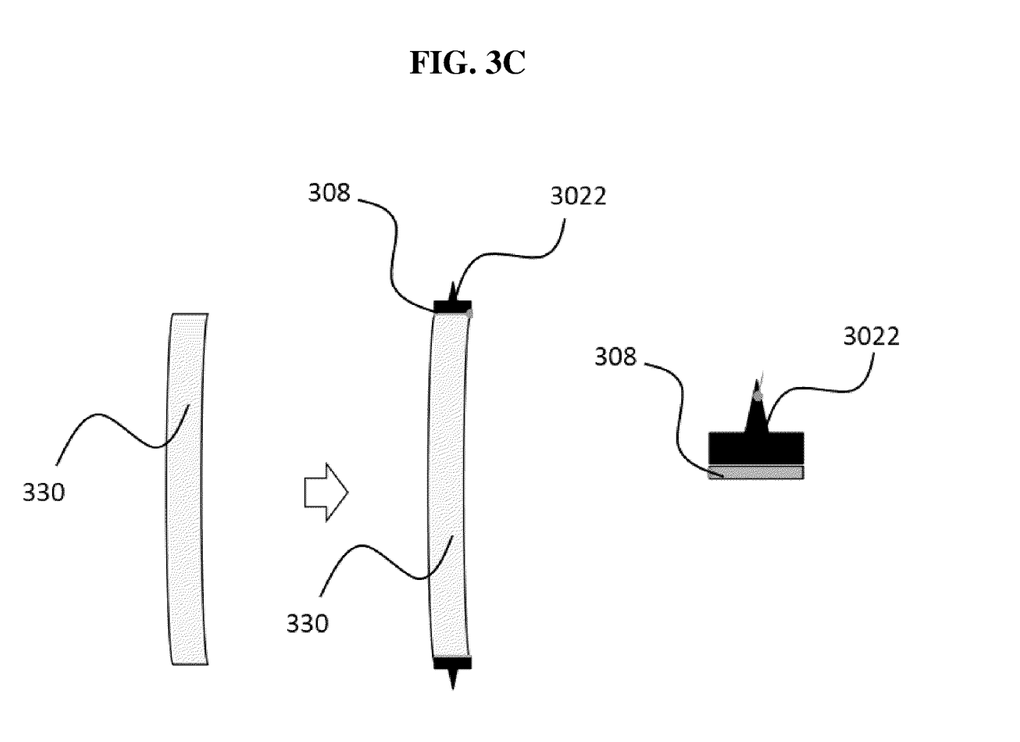
FIG. 3C is a schematic diagram of a process that is being used to attach a preshaped structural element 3022 on an edge surface of an ophthalmic lens 330 according to an embodiment disclosed herein. As shown, the preshaped structural element 3022 is attached to the edge surface by an adhesive 308.

In another embodiment (B) as shown in FIG. 3C, an opaque structure that comprises of a suitable adhesive/locking mechanism on one end to secure itself firmly onto the flat edged surface and which has also a bevel (and other necessary geometry) on the other end to secure itself to the frame, may also be provided to render the edged surface opaque. The adhesive may be selected from the family of epoxies and acrylates (in particular cyanoacrylates for fast bonding). The adhesive may also contain colorants to either absorb reflection or to introduce suitable colour for cosmetic purposes (e.g frame-colour matching). The materials for the bevel structure may be selected from the family of epoxies, polyesters, polyurethanes and ABS. Polymer extrusion and 3D printing may be employed to shape the structure. The bevel structure could be made available in the finished ring form (more rigid materials like ABS could be used) or it could be supplied in the form of long continuous strip (more flexible materials like PU to be used).

By "comprising" it is meant including, but not limited to, whatever follows the word "comprising". Thus, use of the term "comprising" indicates that the listed elements are required or mandatory, but that other elements are optional and may or may not be present.

By "consisting of" is meant including, and limited to, whatever follows the phrase "consisting of". Thus, the phrase "consisting of" indicates that the listed elements are required or mandatory, and that no other elements may be present.

By "about" in relation to a given numerical value, such as for temperature and period of time, it is meant to include numerical values within 10% of the specified value.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

Although representative processes and articles have been described in detail herein, those skilled in the art will recognize that various substitutions and modifications may be made without departing from the scope of what is described and defined by the appended claims.

What is claimed is:

1. An ophthalmic lens comprising:
a first optical surface;
an opposing second optical surface;
an edge surface connecting the first optical surface and the second optical surface, the edge surface being planar; and
a first layer disposed on the edge surface, the first layer comprising a coating material configured to reduce a reflection caused by a profile of the edge surface to one or more of reduce and suppress one or more of a white ring and a myopia ring, said coating material forming the first layer,
wherein one of: (a) the first layer defines a structural element configured to fasten the ophthalmic lens to an eyewear frame, and (b) the ophthalmic lens further comprises a second layer disposed on the first layer, the second layer defining a structural element configured to fasten the ophthalmic lens to an eyewear frame,
wherein the coating material configured to reduce the reflection caused by the profile of the edge surface comprises an opacity agent dispersed in a matrix material, and
wherein, when the second layer is present, the second layer is formed of a material selected from the group consisting of an epoxy, a polyester, a polyurethane, acrylonitrile butadiene styrene, an acrylate, cellulose acetate butyrate, a copolymer thereof, and a combination thereof.

2. The ophthalmic lens according to claim 1, wherein the edge surface is flat.

3. The ophthalmic lens according to claim 1, wherein the matrix material comprises a material selected from the group consisting of a polyurethane, an epoxy, an acrylate, cellulose acetate butyrate, silicone, a polyester, a copolymer thereof, and a combination thereof.

4. The ophthalmic lens according to claim 1, wherein the opacity agent comprises a material selected from the group consisting of carbon black, an organic pigment, an inorganic pigment, titanium dioxide, calcium oxide, beryllium oxide, cerium oxide, barium sulphate, carbon nanotube, and a combination thereof.

5. The ophthalmic lens according to claim 1, wherein, when the second layer is present, the material of the second layer different from the first layer.

6. The ophthalmic lens according to claim 1, wherein the coating material configured to reduce the reflection caused by the profile of the edge surface is configured to reduce a transmission of light through the edge surface.

7. A method of manufacturing an ophthalmic lens, the method comprising:
providing the ophthalmic lens comprising
a first optical surface,
an opposing second optical surface, and
an edge surface connecting the first optical surface and the second optical surface, the edge surface being planar; and
forming a first layer on the edge surface of the ophthalmic lens, said first layer comprising a coating material configured to reduce a reflection caused by a profile of the edge surface, on the edge surface of the ophthalmic lens to one or more of reduce and suppress one or more of a white ring and a myopia ring, said coating material forming the first layer,
wherein one of: (a) the first layer defines a structural element configured to fasten the ophthalmic lens to an eyewear frame, and (b) the method further comprises forming a second layer on the first layer, the second layer defining a structural element configured to fasten the ophthalmic lens to an eyewear frame,
wherein the coating material configured to reduce the reflection caused by the profile of the edge surface comprises an opacity agent dispersed in a matrix material, and
wherein, when the second layer is present, the second layer is formed of a material selected from the group consisting of an epoxy, a polyester, a polyurethane, acrylonitrile butadiene styrene, an acrylate, cellulose acetate butyrate, a copolymer thereof, and a combination thereof.

8. The method according to claim 7, wherein the forming the first layer comprises one of:
(a) disposing the coating material configured to reduce the reflection caused by the profile of the edge surface, surface of the ophthalmic lens, and shaping the disposed coating material to define the structural element configured to fasten the ophthalmic lens to the eyewear frame,
(b) disposing the coating material configured to reduce the reflection caused by the profile of the edge surface, on the edge surface of the ophthalmic lens to shape the material disposed to define the structural element for fastening the ophthalmic lens to an eyewear frame,
(c) providing a preshaped structural element to fasten the ophthalmic lens to the eyewear frame, the preshaped structural element comprises the coating material configured to reduce the reflection caused by the profile of the edge surface, and disposing the preshaped structural element on the edge surface of the ophthalmic lens.

9. The method according to claim 8, wherein the disposing the preshaped structural element further comprises applying an adhesive to one or both of the preshaped structural element and the edge surface of the ophthalmic lens to attach the preshaped structural element to the edge surface of the ophthalmic lens.

10. The method according to claim 7, wherein the forming the second layer comprises one of:
(a) disposing a substance configured to form e second layer on the first layer, and shaping the disposed substance to define the structural element configured to fasten the ophthalmic lens to the eyewear frame,
(b) disposing a substance configured to form the second layer on the first layer to shape the disposed substance to define the structural element configured to fasten the ophthalmic lens to the eyewear frame, and
(c) providing a preshaped structural element configured to fasten the ophthalmic lens to the eyewear frame, the preshaped structural element comprising a substance configured to form the second layer, and disposing the preshaped structural element on the first layer.

11. The method according to claim 10, wherein the disposing the preshaped structural element comprises applying an adhesive to one or both the preshaped structural element and the first layer to attach the preshaped structural element to the first layer.

12. The method according to claim 7, wherein, when the second layer is present, the material of the second layer different from the first layer.

13. An eyewear comprising:
an eyewear frame; and
the ophthalmic lens according to claim 1.

14. The ophthalmic lens according to claim 3, wherein the opacity agent comprises a material selected from the group consisting of carbon black, an organic pigment, an inorganic pigment, titanium dioxide, calcium oxide, beryllium oxide, cerium oxide, barium sulphate, carbon nanotube, and a combination thereof.

\* \* \* \* \*